US008762514B2

(12) United States Patent
Iijima

(10) Patent No.: US 8,762,514 B2
(45) Date of Patent: Jun. 24, 2014

(54) LOAD-TESTING DEVICE AND LOAD-TESTING METHOD

(75) Inventor: Toru Iijima, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 1603 days.

(21) Appl. No.: 12/047,512

(22) Filed: Mar. 13, 2008

(65) Prior Publication Data

US 2008/0189077 A1    Aug. 7, 2008

Related U.S. Application Data

(63) Continuation of application No. PCT/JP2005/018431, filed on Oct. 5, 2005.

(51) Int. Cl.
*G06F 15/173* (2006.01)
*G06F 11/00* (2006.01)

(52) U.S. Cl.
USPC ........................................ 709/224; 714/47.1

(58) Field of Classification Search
USPC ............ 702/182–185, 108, 117–120; 714/47, 714/735–737, 719, 722; 709/224; 324/210, 324/555, 762.01, 763.01
See application file for complete search history.

(56) References Cited

U.S. PATENT DOCUMENTS

| | | | | |
|---|---|---|---|---|
| 4,601,008 A | * | 7/1986 | Kato | 710/260 |
| 5,572,664 A | * | 11/1996 | Bujanos | 714/25 |
| 5,974,572 A | * | 10/1999 | Weinberg et al. | 714/47 |
| 6,467,056 B1 | * | 10/2002 | Satou et al. | 714/720 |
| 6,477,483 B1 | * | 11/2002 | Scarlat et al. | 702/186 |
| 6,665,268 B1 | * | 12/2003 | Sato et al. | 370/242 |
| 6,857,090 B2 | * | 2/2005 | Lee et al. | 714/724 |
| 7,412,349 B2 | * | 8/2008 | Moser et al. | 702/182 |
| 7,483,824 B1 | * | 1/2009 | Hill | 703/14 |
| 7,647,539 B2 | * | 1/2010 | Bussa et al. | 714/738 |
| 7,739,570 B2 | * | 6/2010 | Bag et al. | 714/736 |

(Continued)

FOREIGN PATENT DOCUMENTS

| | | |
|---|---|---|
| JP | 1-315837 | 12/1989 |
| JP | 3-269736 | 12/1991 |

(Continued)

OTHER PUBLICATIONS

IBM TDB. "Processor Architecture for Measurement and Monitoring Functions." [Retrieved from the Internet] Feb. 1, 1990. [Retrieved online on Jun. 14, 2010] <URL:https://priorart.ip.com/viewPub.jsp?stype=dtFreeTextSearch&scache=13656236&snum=0&kw Highlight=true>.*

(Continued)

*Primary Examiner* — Larry Donaghue

(57) ABSTRACT

The performances of computers having various configurations are compared by putting a common load on the computers. Servers (2-1 to 2-n) provide a simulator (4) with a common interface for accepting a processing request. The simulator (4) sequentially sends a processing request in which the contents of the processing is specified to each of the servers (2-1 to 2-n). According to the processing requests, the servers (2-1 to 2-n) perform the processings and send processing responses to the simulator (4). The simulator (4) receives the processing responses, compiles the processing times each from the sending of a processing request to the reception of the processing responses corresponding to the processing request, the usage rates of various resources in the servers (2), etc., and displays the compiled results to the user.

12 Claims, 14 Drawing Sheets

(56) References Cited

U.S. PATENT DOCUMENTS

| | | | |
|---|---|---|---|
| 2002/0157042 A1* | 10/2002 | Krech et al. | 714/45 |
| 2003/0033406 A1* | 2/2003 | John et al. | 709/224 |
| 2004/0078718 A1* | 4/2004 | Sato et al. | 714/43 |
| 2004/0260993 A1* | 12/2004 | Griffin et al. | 714/743 |
| 2007/0282567 A1* | 12/2007 | Dawson et al. | 702/186 |

FOREIGN PATENT DOCUMENTS

| | | |
|---|---|---|
| JP | 09-269736 | 12/1991 |
| JP | 06-177893 | 6/1994 |
| JP | 8-255139 | 10/1996 |
| JP | 08-255139 | 10/1996 |
| JP | 9-73425 | 3/1997 |
| JP | 2002-7232 | 1/2002 |
| JP | 2005-182813 | 7/2005 |

OTHER PUBLICATIONS

International Search Report for PCT/JP2005/018431.
http://www.mercury.com/jp/products/performance-center/loadrunner/, downloaded Mar. 17, 2008.
Iizima Kimihiko, Business Communication, Feb. 1, 2005, vol. 42-2, p. 106-107, JP.

* cited by examiner

FIG. 6

(A) LOAD INFORMATION (CPU)

| TARGET CPU | INTEGER ARITHMETIC | MULTIPLICITY |
| --- | --- | --- |
| | | ARITHMETIC OPERATIONS PER ONE LOOP |
| | | NUMBER OF LOOPS |
| | FLOATING POINT ARITHMETIC | MULTIPLICITY, ETC. |

(B) LOAD INFORMATION (MEMORY, DISK)

| TARGET MEMORY/ TARGET STORAGE DEVICE | SEQUENTIAL READ | MULTIPLICITY |
| --- | --- | --- |
| | | BLOCK SIZE |
| | | TRAFFIC PER ONE LOOP |
| | | NUMBER OF LOOPS |
| | SEQUENTIAL WRITE | MULTIPLICITY, ETC. |
| | RANDOM READ | MULTIPLICITY, ETC. |
| | RANDOM WRITE | MULTIPLICITY, ETC. |

(C) LOAD INFORMATION (NETWORK)

| TARGET NETWORK IF | TRANSMISSION | MULTIPLICITY |
| --- | --- | --- |
| | | BLOCK SIZE |
| | | TRAFFIC PER ONE LOOP |
| | | NUMBER OF LOOPS |
| | | RATIO |
| | RECEPTION | MULTIPLICITY, ETC. |

24

26

SIMULATION PROGRAM 42

FIG. 12

| VIRTUAL CLIENT ID #1 | NUMBER OF VIRTUAL CLIENTS | LOAD CONDITION ID |
|---|---|---|
| VIRTUAL CLIENT ID #2 | NUMBER OF VIRTUAL CLIENTS | LOAD CONDITION ID |
| ... | ... | ... |
| VIRTUAL CLIENT ID #n | NUMBER OF VIRTUAL CLIENTS | LOAD CONDITION ID |

VIRTUAL CLIENT INFORMATION

FIG. 13

| LOAD CONDITION ID # 1 | SERVER UNDER TEST ID | PROCESSING REQUEST FREQUENCY | LOAD INFORMATION # 1 | LOAD INFORMATION # 2 | ... | LOAD INFORMATION # n | RESPONSE METHOD DESIGNATION INFORMATION |
|---|---|---|---|---|---|---|---|
| LOAD CONDITION ID # 2 | SERVER UNDER TEST ID | PROCESSING REQUEST FREQUENCY | LOAD INFORMATION # 1 | LOAD INFORMATION # 2 | ... | LOAD INFORMATION # n | RESPONSE METHOD DESIGNATION INFORMATION |
| ... | ... | ... | ... | ... | ... | ... | |
| LOAD CONDITION ID # n | SERVER UNDER TEST ID | PROCESSING REQUEST FREQUENCY | LOAD INFORMATION # 1 | LOAD INFORMATION # 2 | ... | LOAD INFORMATION # n | RESPONSE METHOD DESIGNATION INFORMATION |

LOAD CONDITION INFORMATION

FIG. 14

| | VIRTUAL CLIENT ID # 1-1 | DURATION |
|---|---|---|
| SIMULATION SEQUENCE ID # 1 | VIRTUAL CLIENT ID # 1-2 | DURATION |
| | | |
| | VIRTUAL CLIENT ID # 1-n | DURATION |
| | VIRTUAL CLIENT ID # 2-1 | DURATION |
| SIMULATION SEQUENCE ID # 2 | VIRTUAL CLIENT ID # 2-2 | DURATION |
| | | |
| | VIRTUAL CLIENT ID # 2-n | DURATION |
| | | |
| | VIRTUAL CLIENT ID # n-1 | DURATION |
| SIMULATION SEQUENCE ID # n | VIRTUAL CLIENT ID # n-2 | DURATION |
| | | |
| | VIRTUAL CLIENT ID # n-n | DURATION |

LOAD-TESTING DEVICE AND LOAD-TESTING METHOD

CLAIM FOR PRIORITY

The present application is a continuation of and claims priority to PCT Application Ser. No. PCT/JP2005/018431 filed on Oct. 5, 2005, the disclosure of which is hereby incorporated by reference in its entirety.

TECHNICAL FIELD

The embodiments of the present invention relate to a load testing apparatus for testing performance of a plurality of kinds of computers and methods for load testing the computers.

BACKGROUND

Configurations of hardware and software, such as an operating system (OS), middleware, applications, etc., of a computer are usually different from one another depending on their manufacturers. In order to compare performance of computers having different configurations, it is necessary to apply a common load to the respective computers.

Therefore, a load testing method improved to be capable of comparing performance of computers having various configurations by applying a common load to the computers is desired.

SUMMARY

According to an embodiment of the present invention, a load testing apparatus conducts a load test on a plurality of kinds of computers under test. The plurality of kinds of computers under test receive a plurality of kinds of processing requests in common from the load testing apparatus; execute processing according to the received processing requests; and return a response indicating the execution of the processing.

The load testing apparatus includes the following: processing-content setting means for setting contents of the respective plurality of kinds of processing; processing-procedure setting means for setting a procedure for requesting the computers under test to perform the respective plurality of kinds of processing; processing requesting means for requesting, in accordance with the set contents of the processing and the set procedure, the computers under test to perform the processing; and response compiling means for compiling responses returned from the computers under test according to the requested processing.

An embodiment of the present invention includes a load testing program for conducting a load test, according to a processing request from an outside, on a plurality of kinds of computers under test. The load testing program causes the computers under test to execute the following: a processing step of performing a plurality of kinds of processing for a load test; a processing-request receiving step of receiving processing requests indicating contents of the plurality of kinds of processing, in common with other kinds of computers under test; and a processing control step of controlling the processing step to execute one or more of the plurality of kinds of processing, in accordance with the content of the processing indicated by the received processing request.

An embodiment of the present invention includes a load testing system including the following: a plurality of kinds of computers under test; and a load testing apparatus that conducts a load test on these computers under test. Each of the plurality of kinds of computers under test include the following: processing-request receiving means for receiving a plurality of kinds of processing requests in common from the load testing apparatus; processing executing means for executing processing according to the received processing requests; and responding means for returning a response indicating the execution of the processing. The load testing apparatus includes the following: processing-content setting means for setting a content of each of the plurality of kinds of processing; processing-procedure setting means for setting a processing for requesting the computers under test to perform each of the plurality of kinds of processing; processing requesting means for requesting the computers under test to perform processing in accordance with the set content of the processing and the procedure; and response compiling means for compiling responses returned from the computers under test according to the requested processing.

An embodiment of the present invention includes a load testing method for a load testing system. The load testing system includes the following: a plurality of kinds of computers under test; and a load testing apparatus that conducts a load test on these computers under test. Each of the plurality of kinds of computers under test receives a plurality of kinds of processing requests in common from the load testing apparatus; executes processing according to the received processing requests; and returns a response indicating the execution of the processing. The load testing apparatus sets content of each of the plurality of kinds of processing; sets a processing for requesting the computers under test to perform each of the plurality of kinds of processing; requests the computers under test to perform processing in accordance with the set content of the processing and the procedure; and compiles responses returned from the computers under test according to the requested processing.

BRIEF DESCRIPTION OF THE DRAWINGS

FIGS. 3(A) to (C) illustrate diagrams showing modes of load tests conducted on respective servers by simulators in the load testing system shown in FIG. 1, in which FIGS. 3(A) to (C) show load tests conducted on first, second, and n-th servers, respectively, according to embodiments.

FIGS. 6(A) to (C) illustrate a diagram showing the load information shown in FIG. 5, in which FIG. 6(A) shows load information indicating a content of load processing executed by a CPU-load processing section, FIG. 6(B) shows load information indicating a content of load processing executed by a memory-load processing section and a storage-device-load processing section, and FIG. 6(C) shows load information indicating a content of load processing executed by a network-load processing section, according to embodiments.

FIG. 12 illustrates a diagram showing virtual client information created by a virtual-client-information creating section shown in FIG. 11, according to an embodiment.

FIG. 13 illustrates a diagram showing load condition information created by a load-condition creating section shown in FIG. 11, according to an embodiment.

FIG. 14 illustrates a diagram showing simulation sequence information created by a simulation-sequence creating section shown in FIG. 11, according to an embodiment.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the description of the embodiments.

Load Testing System 1

Figure 1:
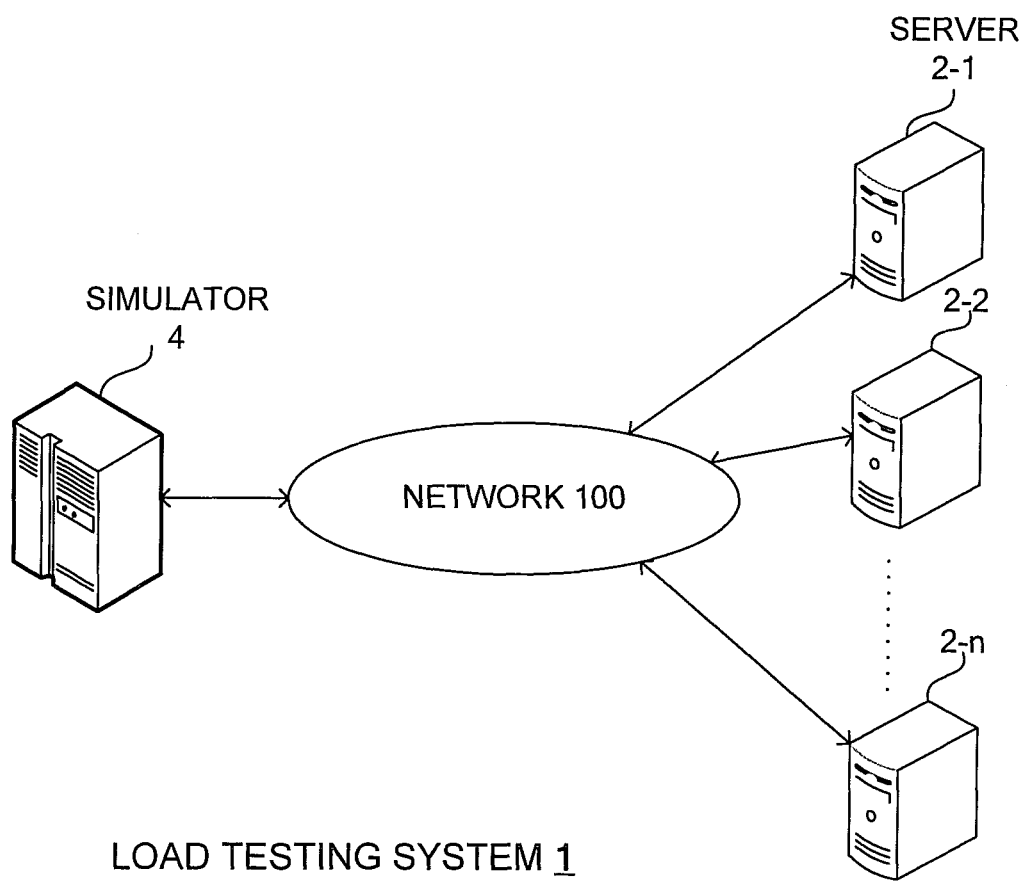
FIG. 1 illustrates a diagram showing a configuration of a load testing system to which a load testing method, according to an embodiment.

FIG. 1 is a diagram showing a configuration of a load testing system 1 to which a load testing method according to the present invention is applied.

As shown in FIG. 1, the load testing system 1 includes "n" servers 2-1 to 2-n, which are different from one another in hardware configuration and the like, and a simulator 4, which are connected through a network 100 such as a LAN.

It should be noted that "n" indicates an integer equal to or larger than 1, and all n's do not always indicate the same number.

Also, in the following description, the servers 2-1 to 2-n may be simply described as server 2 or the like, when the component refers to any one of a possible plurality of components.

Further, the server 2 and the simulator 4 may be generally referred to as nodes.

Also, in the respective figures referred to below, substantially the same components are denoted by the same reference numerals and symbols.

Hardware Configuration

Figure 2:
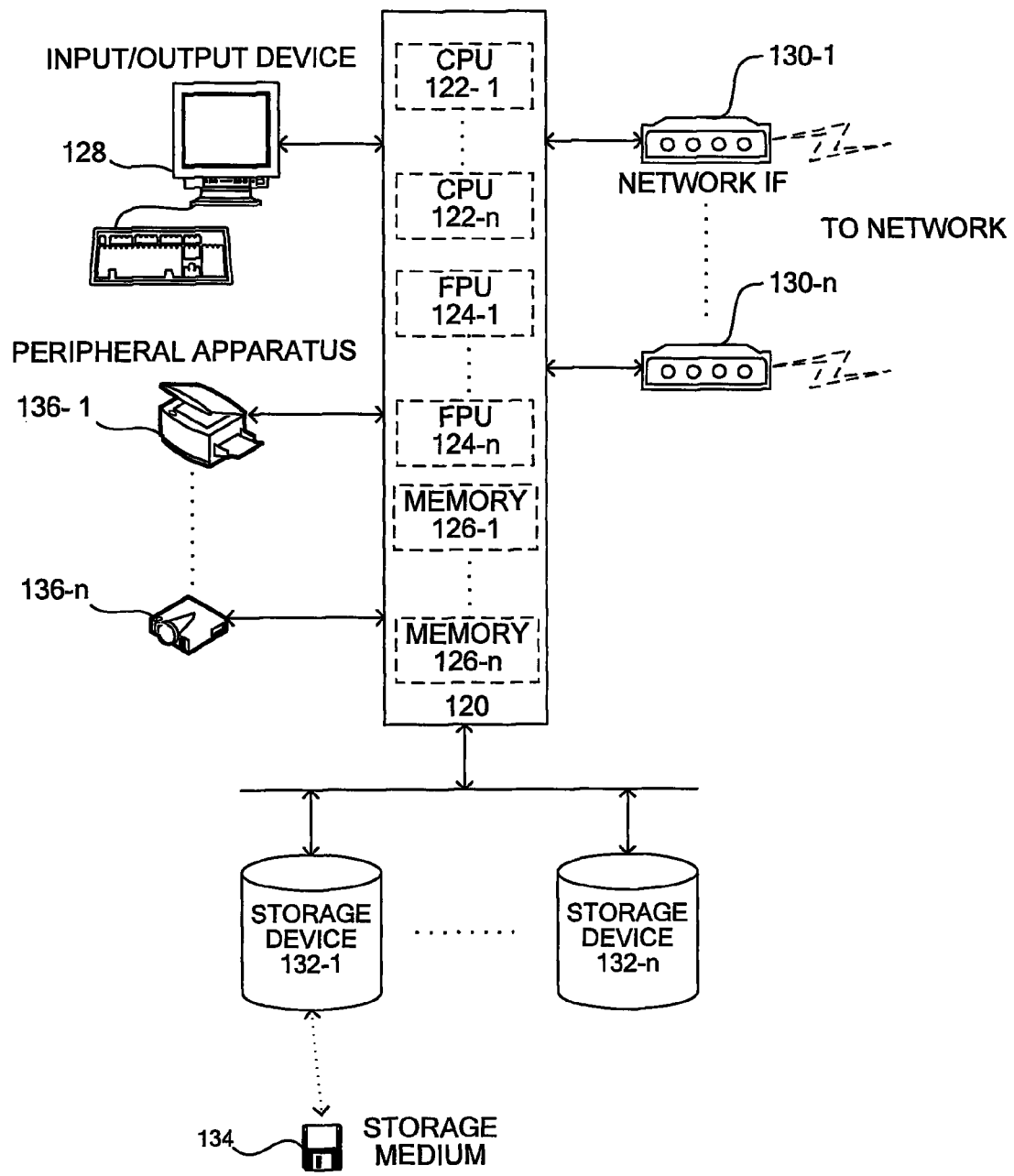
FIG. 2 illustrates a diagram showing an example of a hardware configuration of a server and a simulator shown in FIG. 1, according to an embodiment.

FIG. 2 is a diagram showing an example of a hardware configuration of the server 2 and the simulator 4 shown in FIG. 1.

As shown in FIG. 2, the server 2 and the simulator 4 include a main body 120 including arithmetic devices (CPUs) 122-1 to 122-n, floating-point arithmetic devices (FPUs) 124-1 to 124-n, and memories 126-1 to 126-n, an input/output device 128 including a keyboard and a display, network interfaces (IFs) 130-1 to 130-n, storage devices 132-1 to 132-n, and "n" peripheral apparatuses 136-1 to 136-n.

The input/output device 128 includes a keyboard and a display and performs input and output of data between the server 2 and simulator 4 and the outside.

The network IF 130 performs communication with other nodes.

The storage devices 132 include a CD device, an HD device, and the like, and perform storage and reproduction of data in and from a storage medium 134.

The peripheral apparatuses 136 include a printer, a projector, and the like, and added to the server 2 and the simulator 4 when necessary.

In other words, the server 2 and the simulator 4 have components of computers that are capable of performing communication among nodes.

However, since the servers 2-1 to 2-n may be manufactured by a plurality of manufacturers, configurations of hardware and the like thereof are not always the same.

Modes of Load Tests

Figure 3:
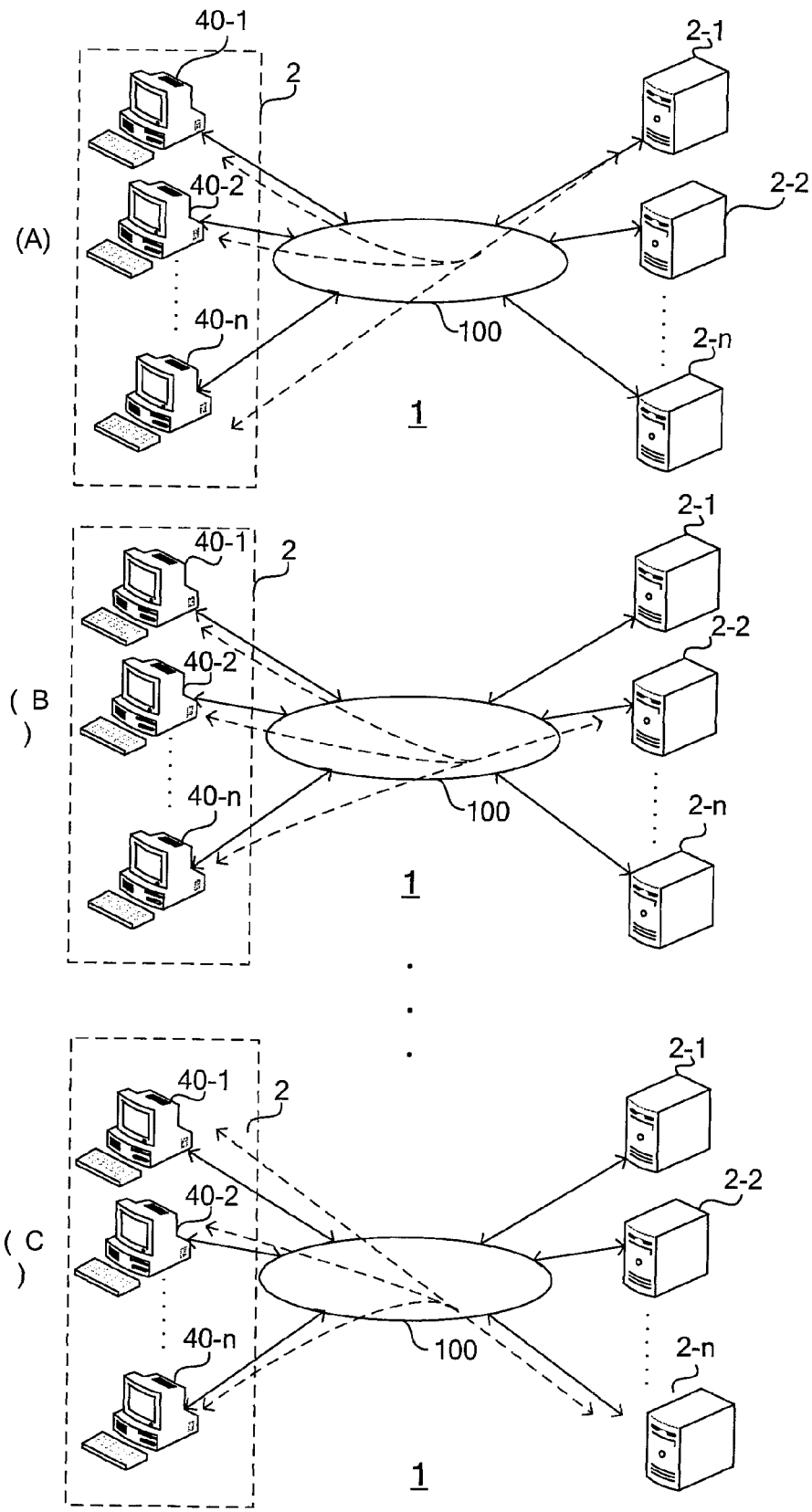

FIG. 3 is a diagram showing modes of load tests conducted on the respective servers 2 by the simulator 4 in the load testing system 1 shown in FIG. 1. (A) to (C) show load tests conducted on first, second, and n-th servers 2-1, 2-2, and 2-n, respectively.

In the load testing system 1, with these components, the simulator 4 applies a common load to the respective servers 2-1 to 2-n such that these servers can be compared in performance, and tests the performance as explained below.

In the load testing system 1, the simulator 4 simulates "n" virtual client apparatuses 40-1 to 40-n that sequentially request the respective servers 2-1 to 2-n to perform common processing as indicated by the dotted lines in FIGS. 3(A) to 3(C), and apply loads to the servers 2-1 to 2-n such that the servers can be compared in performance.

The servers 2-1 to 2-n respectively perform processing according to the processing request from the simulators 40-1 to 40-n, and return responses indicating results of the processing and the like to the simulators 40-1 to 40-n.

On the simulator 4 side, for example, an average time from the request to the respective servers 2-1 to 2-n to the responses is compiled as information for performing comparison of performance of the servers 2-1 to 2-n.

Software

Software executed on respective nodes of the load testing system 1 is explained below.

Figure 4:
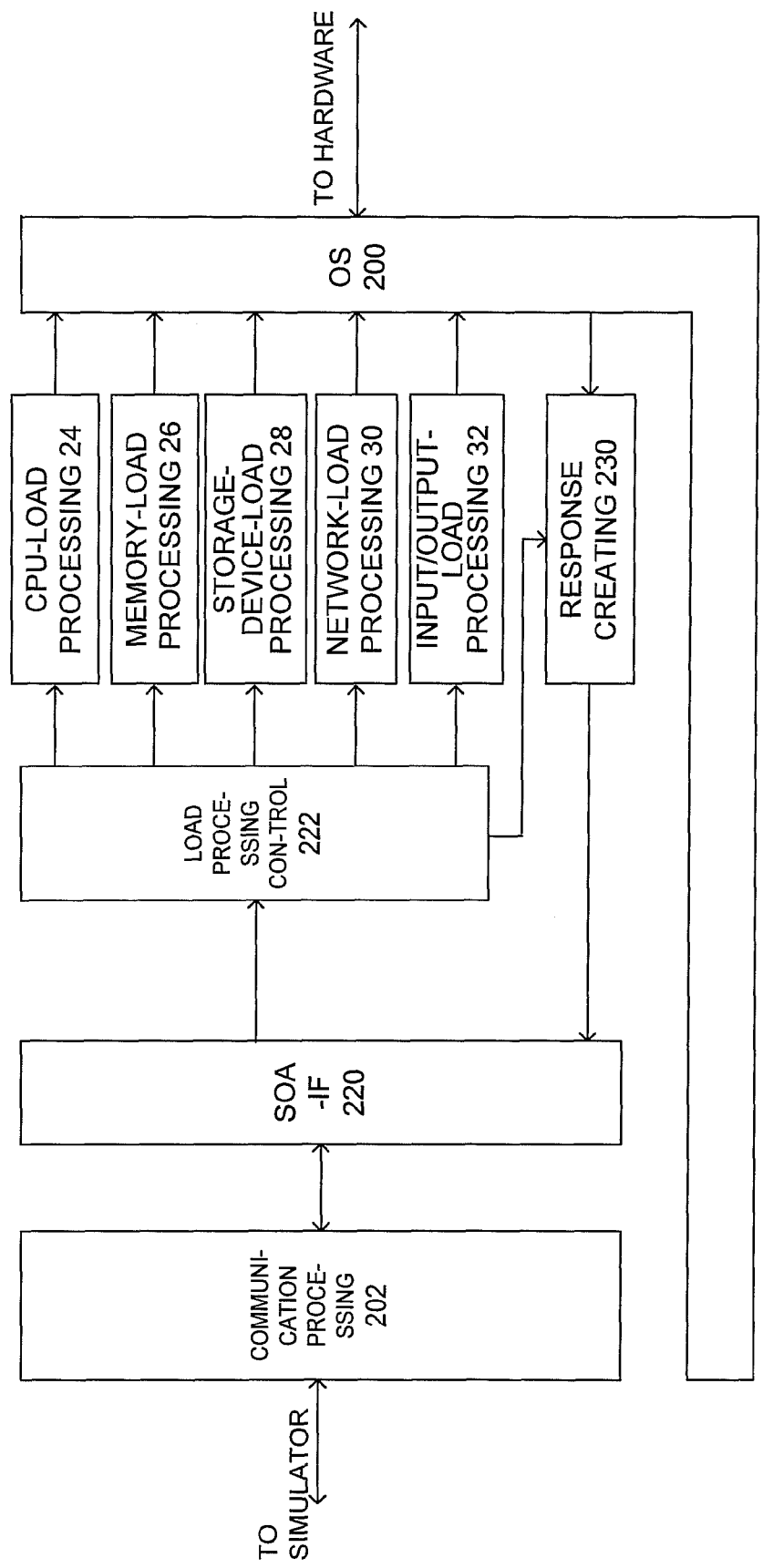
FIG. 4 illustrates a diagram showing a configuration of a program under test executed in the server shown in FIG. 1, according to an embodiment.

FIG. 4 is a diagram showing a configuration of a program under test 20 executed in the server 2 shown in FIG. 1.

As shown in FIG. 4, the program under test 20 includes a communication processing section 202, an SOA (Service Oriented Architecture)-IF 220, a load-processing control section 222, a CPU-load processing section 24, a memory-load processing section 26, a storage-device-load processing section 28, a network-load processing section 30, an input/output-load processing section 32, and a response creating section 230.

The program under test 20 is supplied to the server 2 through, for example, a network or a storage medium 134, loaded into a memory 126, and executed on an operating system (OS) 200 installed in the server 2 specifically using the hardware (FIG. 2) of the server 2.

With these components, the program under test 20 receives a processing request including parameters indicating a content of processing for applying a load to the server 2 (load processing) and a setting for hardware components and the like used for execution of the load processing.

Moreover, the program under test 20 performs the load processing in accordance with the received processing request and returns a response indicating a result of the load processing, the end of the load processing, and the like to the simulator 4.

In the program under test 20, the communication processing section 202 performs processing necessary for performing communication with the simulator 4.

The SOA-IF 220 provides all the servers 2-1 to 2-n with a common message exchange interface with respect to the simulator 4.

The SOA-IF 220 can provide various services other than a Web service. However, for specification and clarification of the explanation, in the following description, as a specific example, the SOA-IF 220 provides a common interface for providing the Web service with respect to the simulator 4.

In this case, the SOA-IF 220 receives a processing request described in XML (eXtensible Markup Language) from the simulator 4 through the network 100 and the communication processing section 202 and outputs the processing request to the load-processing control section 222.

Moreover, the SOA-IF 220 receives a processing response, in which a result and the like of the load processing performed by the memory-load processing section 26 and the like according to the processing request from the simulator 4 are described in XML, from the response creating section 230 and returns the processing response to the simulator 4 through the communication processing section 202 and the network 100.

Figure 5:
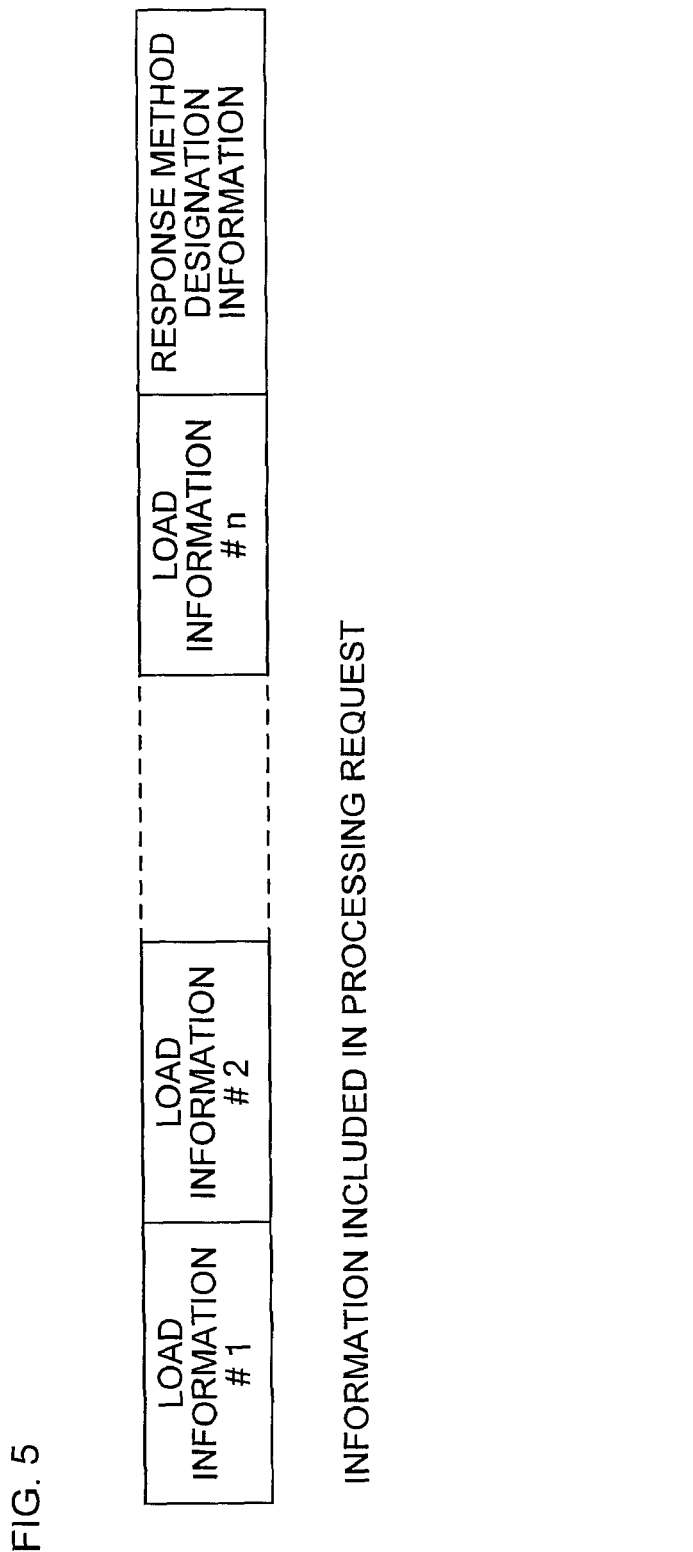
FIG. 5 illustrates a diagram showing load processing information that is included in a processing request issued from the simulator with respect to the server shown in FIG. 1 and shows a content of load processing, according to an embodiment.

FIG. 5 is a diagram showing load processing information indicating a content of load processing included in the processing request issued from the simulator 4 to the server 2 shown in FIG. 1.

FIG. 6 is a diagram showing load information shown in FIG. 5. (A) shows load information indicating a content of load processing executed by the CPU-load processing section 24, (B) shows load information indicating a content of load processing executed by the memory-load processing section 26 and the storage-device-load processing section 28, and (C) shows load information indicating a content of load processing executed by the network-load processing section 30.

However, FIGS. 6(A) to 6(C) are intended to show, for specification and clarification of the explanation, examples of the load information set in the CPU-load processing section 24, the memory-load processing section 26, the storage-device-load processing section 28, and the network-load processing section 30, and are not intended to limit parameters included in the load information.

As shown in FIG. 5, the processing request sent from the simulator 4 to the respective servers 2 includes load processing information including "n" pieces of load information shown in FIGS. 6(A) to 6(C) and response method designation information designating a method of returning a processing response to the simulator 4 such as a content of the processing response to the simulator 4.

The load-processing control section 222 (FIG. 4) sets parameters, which are included in the load information (FIGS. 6(A) to 6(C)) included in a processing request inputted from the communication processing section 202, in the CPU-load processing section 24, the memory-load processing section 26, the storage-device-load processing section 28, the network-load processing section 30, and the input/output load processing section 32, respectively, and causes the sections to execute load processing.

Figure 7:
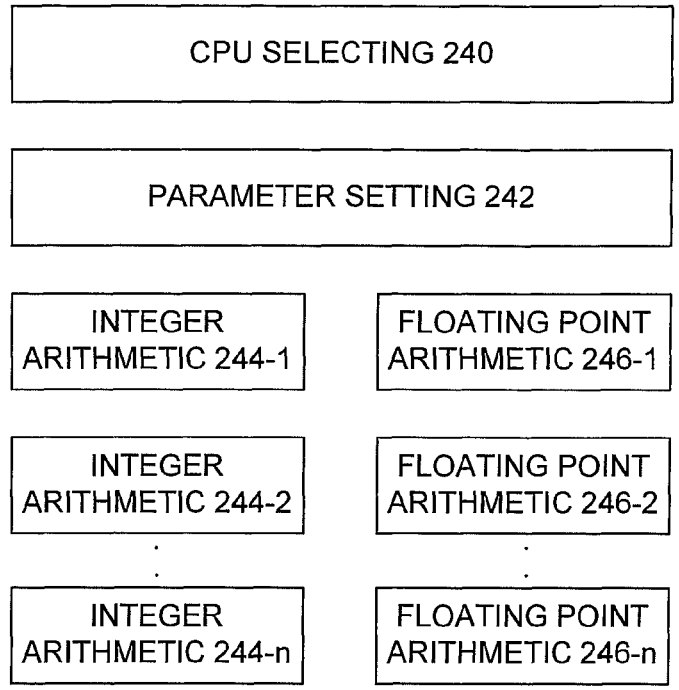
FIG. 7 illustrates a diagram showing a configuration of the CPU-load processing section shown in FIG. 4, according to an embodiment.

FIG. 7 is a diagram showing a configuration of the CPU-load processing section 24 shown in FIG. 4.

As shown in FIG. 7, the CPU-load processing section 24 includes a CPU selecting section 240, a parameter setting section 242, integer arithmetic sections 244-1 to 244-n, and floating point arithmetic sections 246-1 to 246-n.

With these components, the CPU-load processing section 24 executes, in accordance with the load information shown in FIG. 6(A), load processing for applying a load to both or any one of the CPU 122 and FPU 144 (FIG. 2) of the server 2 (CPU load processing).

As shown in FIG. 6(A), load information indicating a content of load processing for applying a load to the CPU 122 and the FPU 124 includes target CPU information, integer arithmetic information, floating point arithmetic information, and parameters of these pieces of information.

Among the pieces of load information, the target CPU information is used for execution of CPU processing and designates any one of the CPUs 122-1 to 122-n and FPUs 124-1 to 124-n to which a load is applied.

The integer arithmetic information designates any one of the integer arithmetic sections 244 that executes the CPU load processing.

The floating point arithmetic information designates any one of the floating point arithmetic sections 246 that executes the CPU load processing.

It should be noted that, when only any one of the integer arithmetic or the floating point arithmetic is performed by the CPU load processing, only any one of the integer arithmetic information or the floating point arithmetic information is included in the load information.

As parameters for the integer arithmetic or the floating point arithmetic, multiplicity, and the number of arithmetic operations per one loop, and the number of times of loop are included.

Among these parameters, the multiplicity designates multiplicity (the number of the similar processings performed at the same time) of the integer arithmetic or the floating point arithmetic performed in the CPU load processing.

The number of arithmetic operations per one loop designates the number of arithmetic operations performed per one loop processing by the integer arithmetic section 244 or the floating point arithmetic section 246 that performs the CPU load processing.

The number of times of loop designates the number of kinds of loop processing repeated by the integer arithmetic section 244 or the floating point arithmetic section 246 that performs the CPU load processing.

The CPU selecting section 240 of the CPU-load processing section 24 (FIG. 7) selects, in accordance with the target CPU information included in the load information, the CPU 122 or the FPU 124 that executes the CPU load processing.

The parameter setting section 242 selects, in accordance with the integer arithmetic information and the floating point arithmetic information, the integer arithmetic section 244 or the floating point arithmetic section 246 that executes the CPU load processing, and sets parameters in the integer arithmetic section 244 or the floating point arithmetic section 246 thus selected.

The integer arithmetic sections 244-1 to 244-n perform integer arithmetic processing of different contents, respectively.

The integer arithmetic section 244 selected by the parameter setting section 242 executes, in accordance with the set parameters, the integer arithmetic processing by using the CPU 122 or the FPU 124 selected by the CPU selecting section 240.

The floating point arithmetic sections 246-1 to 246-n perform floating point arithmetic processing of different contents, respectively.

The floating point arithmetic section 246 selected by the parameter setting section 242 executes, in accordance with the set parameters, the floating point arithmetic processing for the CPU 122 or the FPU 124 selected by the CPU selecting section 240.

Figure 8:
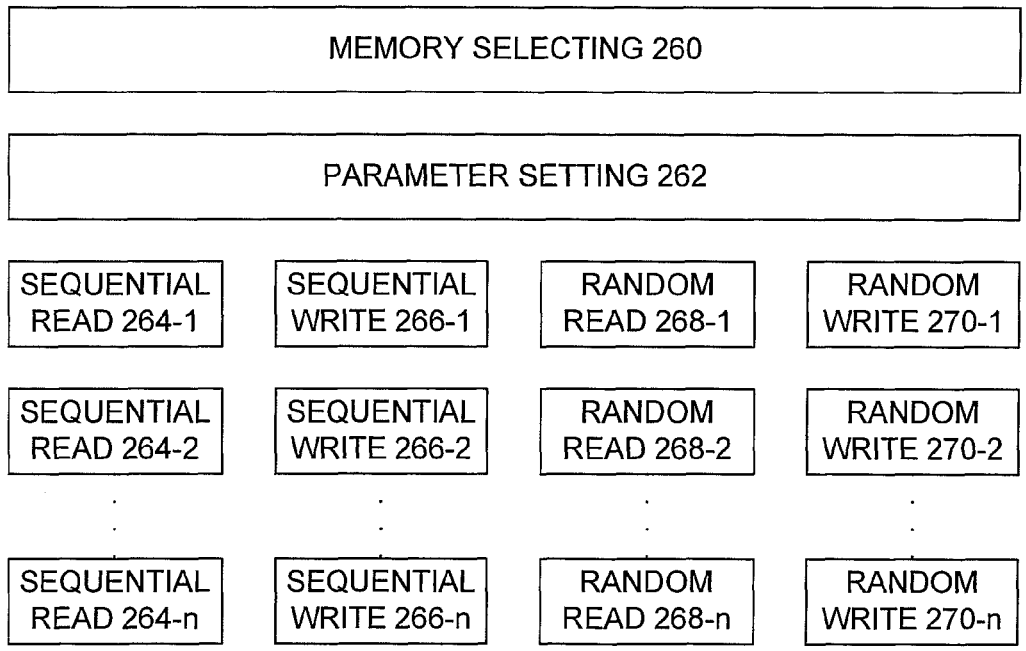
FIG. 8 illustrates a diagram showing a configuration of the memory-load processing section shown in FIG. 4, according to an embodiment

FIG. 8 is a diagram showing a configuration of the memory-load processing section 26 shown in FIG. 4.

As shown in FIG. 8, the memory-load processing section 26 includes a memory selecting section 260, a parameter setting section 262, sequential-read processing sections 264-1 to 264-n, sequential-write processing sections 266-1 to 266-n, random-read processing sections 268-1 to 268-n, and random-write processing sections 270-1 to 270-n.

With these components, the memory-load processing section 26 executes, in accordance with the load information shown in FIG. 6(B), load processing for applying a load to any one of the memories 126-1 to 126-n (FIG. 2) of the server 2 (memory load processing).

As shown in FIG. 6(B), the load information indicating a content of load processing for applying a load to the memory 126 includes target memory information, sequential read information, sequential write information, random read information, random write information, and parameters of these pieces of information.

Among the pieces of load information, the target memory information is used for execution of memory load processing and designates any one of the memories 126-1 to 126-n to which a load is applied.

The sequential read information designates any one of the sequential-read processing sections 264 that executes the memory load processing.

The sequential write information designates any one of the sequential-write processing sections 266 that executes the memory load processing.

The random read information designates any one of the random-read processing sections 268 that executes the memory load processing.

The random write information designates any one of the random-write processing sections 270 that executes the memory load processing.

When only a part of sequential read, sequential write, random read, and random write is performed by the memory load processing, only a part of the sequential read information, the sequential write information, the random read information, and the random write information is included in the load information.

As parameters for the sequential read, the sequential write, the random read, and the random write, multiplicity, a block size, traffic per one loop, and the number of loops are included.

Among these parameters, the multiplicity designates multiplicity of sequential read, sequential write, random read, or random write performed in the memory load processing.

The traffic per one loop designates a data amount transferred for one kind of loop processing by the sequential-read processing section 264, the sequential-write processing section 266, the random-read processing section 268, or the random-write processing section 270 that performs the memory load processing.

The number of loops designates the number of kinds of loop processing repeated by the sequential-read processing section 264, the sequential-write processing section 266, the random-read processing section 268, or the random-write processing section 270 that performs the memory load processing.

The memory selecting section 260 of the memory-load processing section 26 (FIG. 8) selects, in accordance with the target memory information included in the load information, the memory 126 that executes the memory load processing.

The parameter setting section 262 selects, in accordance with the sequential read information, the sequential write information, the random read information, and the random write information, the sequential-read processing section 264, the sequential-write processing section 266, the random-read processing section 268, or the random-write processing section 270 that executes the memory load processing, and sets parameters in the sequential-read processing section 264, the sequential-write processing section 266, the random-read processing section 268, or the random-write processing section 270 thus selected.

The sequential-read processing sections 264-1 to 264-n perform sequential read processing of different contents, respectively.

The sequential-read processing section 264 selected by the parameter setting section 262 executes, in accordance with the set parameters, the sequential read processing for the memory 126 selected by the memory selecting section 260.

The sequential-write processing sections 266-1 to 266-n perform sequential write processing of different contents, respectively.

The sequential-write processing section 266 selected by the parameter setting section 262 executes, in accordance with the set parameters, the sequential write processing for the memory 126 selected by the memory selecting section 260.

The random-read processing sections 268-1 to 268-n perform random read processing of different contents, respectively.

The random-read processing section 268 selected by the parameter setting section 262 executes, in accordance with the set parameters, the random read processing for the memory 126 selected by the memory selecting section 260.

The random-write processing sections 270-1 to 270-n perform random write processing of different contents, respectively.

The random-write processing section 270 selected by the parameter setting section 262 executes, in accordance with the set parameters, the random write processing for the memory 126 selected by the memory selecting section 260.

Figure 9:
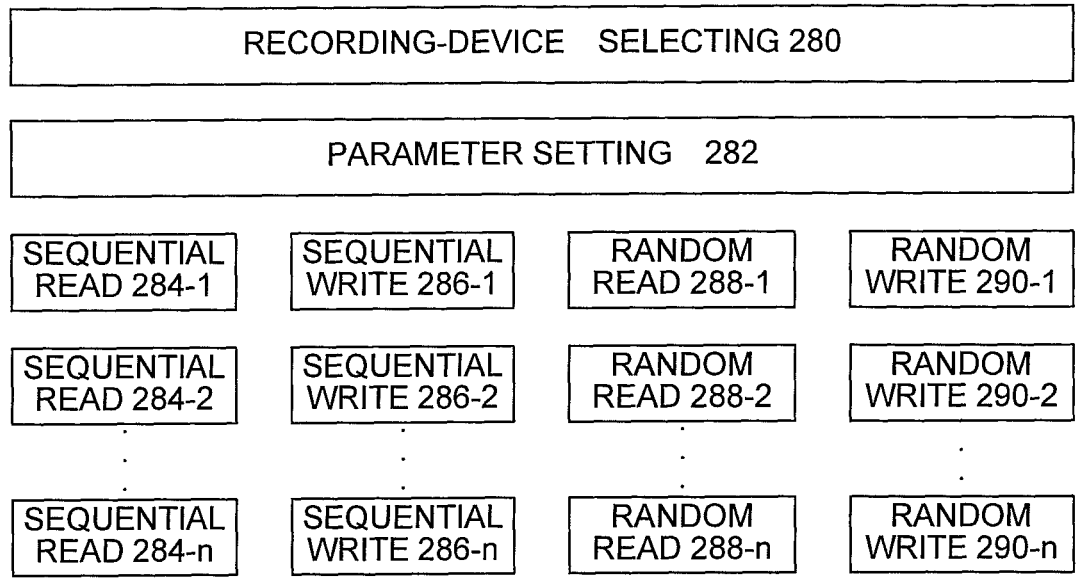
FIG. 9 illustrates a diagram showing a configuration of the storage-device-load processing section shown in FIG. 4, according to an embodiment.

FIG. 9 is a diagram showing a configuration of the storage-device-load processing section 28 shown in FIG. 4.

As shown in FIG. 9, the storage-device-load processing section 28 includes a storage-device selecting section 280, a parameter setting section 282, sequential-read processing sections 284-1 to 284-n, sequential-write processing sections 286-1 to 286-n, random-read processing sections 288-1 to 288-n, and random-write processing sections 290-1 to 290-n.

With these components, the storage-device-load processing section 28 executes, in accordance with the load information shown in FIG. 6(B), load processing for applying a load to any one of the storage devices 132-1 to 132-n (FIG. 2) of the server 2 (storage device load processing).

As shown in FIG. 6(B), the load information indicating a content of load processing for applying a load to the storage device 132 includes target storage device information, sequential read information, sequential write information, random read information, random write information, and parameters of these pieces of information.

Among the pieces of load information, the target network IF information is used for execution of storage device load processing and designates any one of the storage devices 132-1 to 132-n to which a load is applied.

The sequential read information designates any one of the sequential-read processing sections 284 that executes the storage device load processing.

The sequential write information designates any one of the sequential-write processing sections 286 that executes the storage device load processing.

The random read information designates any one of the random-read processing sections 288 that executes the storage device load processing.

The random write information designates any one of the random-write processing sections 290 that executes the storage device load processing.

When only a part of sequential read, sequential write, random read, and random write is performed by the storage device load processing, only a part of the sequential read information, the sequential write information, the random read information, and the random write information is included in the load information.

As parameters for the sequential read, the sequential write, the random read, and the random write, multiplicity, a block size, traffic per one loop, and the number of loops are included.

Among these parameters, the multiplicity designates multiplicity of sequential read, sequential write, random read, or random write performed in the storage device load processing.

The traffic per one loop designates a data amount transferred for one kind of loop processing by the sequential-read processing section 284, the sequential-write processing section 286, the random-read processing section 288, or the random-write processing section 290 that performs the storage device load processing.

The number of loops designates the number of kinds of loop processing repeated by the sequential-read processing section 284, the sequential-write processing section 286, the random-read processing section 288, or the random-write processing section 290 that performs the storage device load processing.

The storage device selecting section 280 of the storage device-load processing section 28 (FIG. 9) selects, in accordance with the target storage device information included in the load information, the storage device 132 that executes the storage device load processing.

The parameter setting section 282 selects, in accordance with the sequential read information, the sequential write information, the random read information, and the random write information, the sequential-read processing section 284, the sequential-write processing section 286, the random-read processing section 288, or the random-write processing section 290 that executes the storage device load processing, and sets parameters in the sequential-read processing section 284, the sequential-write processing section 286, the random-read processing section 288, or the random-write processing section 290 thus selected.

The sequential-read processing sections 284-1 to 284-n perform sequential read processing of different contents, respectively.

The sequential-read processing section 284 selected by the parameter setting section 282 executes, in accordance with the set parameters, the sequential read processing for the storage device 132 selected by the storage device selecting section 280.

The sequential-write processing sections 286-1 to 286-n perform sequential write processing of different contents, respectively.

The sequential-write processing section 286 selected by the parameter setting section 282 executes, in accordance with the set parameters, the sequential write processing for the storage device 132 selected by the storage device selecting section 280.

The random-read processing sections 288-1 to 288-n perform random read processing of different contents, respectively.

The random-read processing section 288 selected by the parameter setting section 282 executes, in accordance with the set parameters, the random read processing for the storage device 132 selected by the storage device selecting section 280.

The random-write processing sections 290-1 to 290-n perform random write processing of different contents, respectively.

The random-write processing section 290 selected by the parameter setting section 282 executes, in accordance with the set parameters, the random write processing for the storage device 132 selected by the storage device selecting section 280.

Figure 10:
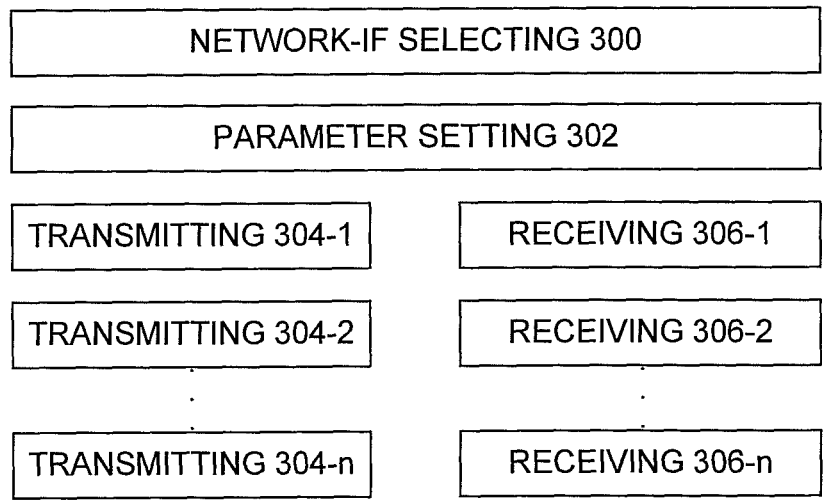
FIG. 10 illustrates a diagram showing a configuration of the network-load processing section shown in FIG. 4, according to an embodiment.

FIG. 10 is a diagram showing a configuration of the network-load processing section 30 shown in FIG. 4.

As shown in FIG. 10, the network-load processing section 30 includes a network IF 300, a parameter setting section 302, transmitting sections 304-1 to 304-n, and receiving sections 306-1 to 306-n.

With these components, the network-load processing section 30 executes, in accordance with the load information shown in FIG. 6(C), load processing for applying a load to any one of the network IFs 130-1 to 130-n (FIG. 2) of the server 2 (network IF load processing).

As shown in FIG. 6(C), the load information indicating a content of load processing for applying a load to the network IF 130 includes target network IF information, transmission information, reception information, and parameters of these pieces of information.

Among the pieces of load information, the target storage device information is used for execution of network IF load processing and designates any one of the network IFs 130-1 to 130-n to which a load is applied.

The transmission information designates any one of the transmitting sections 304 that executes the network IF load processing.

The reception information designates any one of the receiving sections 306 that executes network IF load processing.

When only one of transmission and reception is performed by the network IF load processing, only one of the transmission information and the reception information is included in the load information.

As parameters for the transmission and the reception, multiplicity, a block size, and traffic per one loop, the number of loops, and a ratio are included.

Among these parameters, the multiplicity designates multiplicity of transmission or reception performed in the network IF load processing.

The traffic per one loop designates a data amount transferred for one kind of loop processing by the transmitting section 304 or the receiving section 306 that performs the network IF load processing.

The number of loops designates the number of kinds of loop processing repeated by the transmitting section 304 or the receiving section 306 that performs the network IF load processing.

The network IF 300 of the network-load processing section 30 (FIG. 10) selects, in accordance with the target network IF information included in the load information, the network IF 130 that executes the network IF load processing.

The parameter setting section 302 selects, in accordance with the transmission information and the reception information, the transmitting section 304 or the receiving section 306 that executes the network IF load processing, and sets parameters in the transmitting section 304 or the receiving section 306 thus selected.

The transmitting sections 304-1 to 304-n perform transmission processing of different contents, respectively.

The transmitting section 304 selected by the parameter setting section 302 executes, in accordance with the set parameters, the transmission processing for the network 100 that uses the network IF 130 selected by the network IF 300.

The receiving sections 306-1 to 306-n perform reception processing of different contents, respectively.

The reception processing section 306 selected by the parameter setting section 302 executes, in accordance with the set parameters, the reception processing using the network IF 130 selected by the network IF 300.

In the same manner as the CPU-load processing section 24 and the like, the input/output-load processing section 32 performs, in accordance with a processing request, input/output processing for the selected peripheral apparatus 136 and performs input/output load processing for applying a load to the peripheral apparatus 136.

The response creating section 230 creates, in accordance with the response method designation information included in the load processing information (FIG. 5), a processing response indicating results of the respective CPU load processing, memory load processing, storage device load processing, network IF load processing, and input/output load processing executed according to the processing request from the simulator 4 or indicating the end of each of these kinds of processing.

The response creating section 230 returns the created processing response to the simulator 4 through the communication processing section 202 and the network 100.

Figure 11:
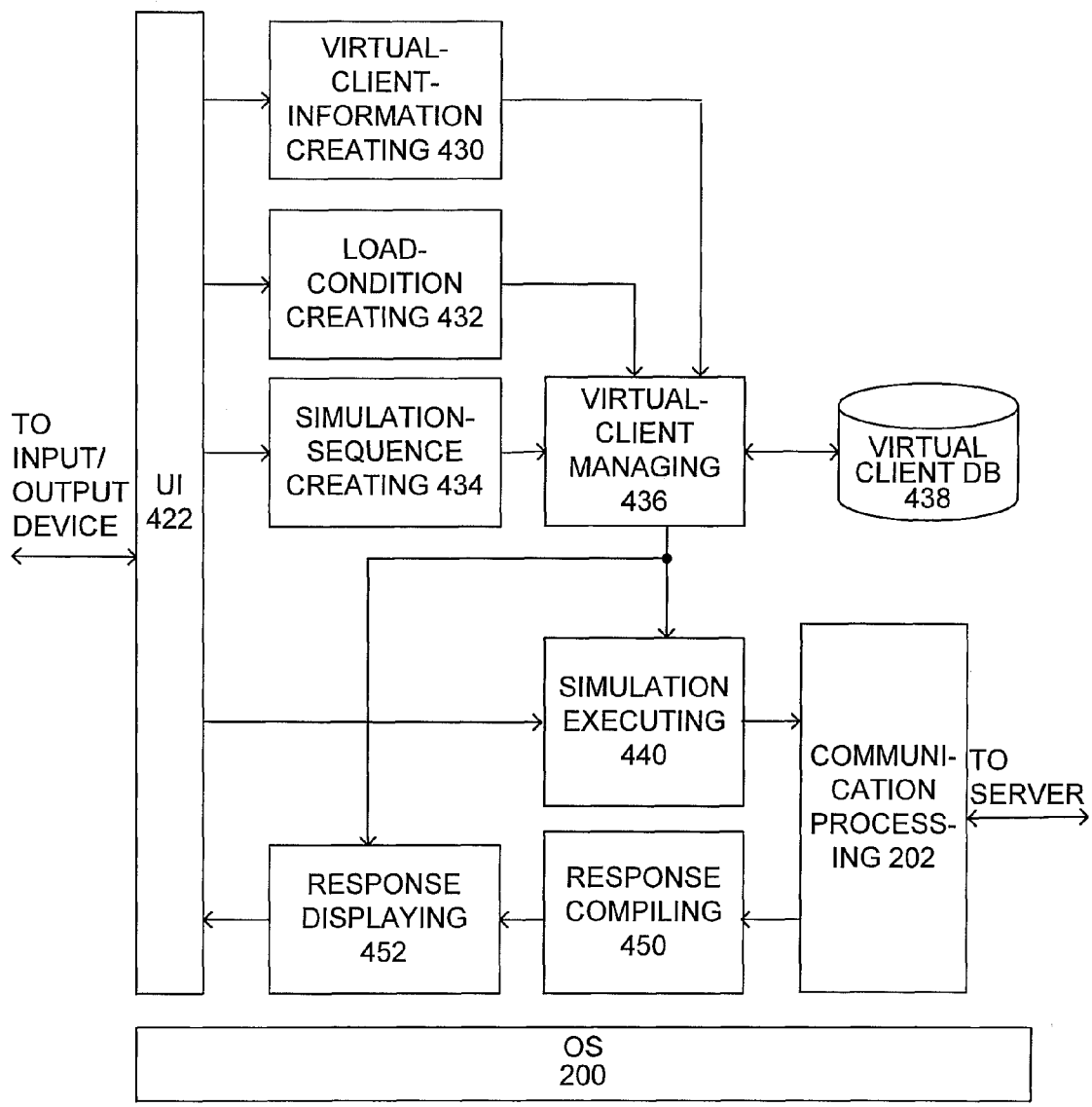
FIG. 11 illustrates a diagram showing a configuration of a simulation program executed in the simulator shown in FIG. 1, according to an embodiment.

FIG. 11 is a diagram showing the configuration of a simulation program 42 executed in the simulator 4 shown in FIG. 1.

As shown in FIG. 11, the simulation program 42 includes an OS 200, a communication processing section 202, a user interface (UI) section 422, a virtual-client-information creating section 430, a load-condition creating section 432, a simulation-sequence creating section 434, a virtual-client managing section 436, a virtual client DB 438, a simulation executing section 440, a response receiving section 450, and a response displaying section 452.

With these components, the simulation program 42 simulates the virtual clients 40-1 to 40-n (FIG. 3), issues processing requests to the respective servers 2, compiles responses returned in response to the processing requests, and tests performance of the respective servers 2.

As test items for performance of the server 2, various items such as a processing time from a processing request to a response and a usage rate of resources such as the CPU 122 (FIG. 2) can be described as examples. However, in the following description, for specification and clarification of the explanation, as a specific example, the processing time of the server 2 is explained as a test item for performance.

In the simulation program 42, the UI section 422 receives an operation of the user on the input/output device 128 (FIG. 2) of the simulator 4, and outputs information indicating the received operation to the respective components of the simulation program 42.

Also, the UI section 422 controls processing performed by the components of the simulation program 42 according to the operation of the user.

FIG. 12 is a diagram showing virtual client information created by the virtual-client-information creating section 430 shown in FIG. 11.

The virtual-client-information creating section 430 creates virtual client information shown in FIG. 12 according to an operation of the user.

As shown in FIG. 12, the virtual client information includes virtual client identifiers (IDs) of the virtual clients 40 (FIG. 3), the number of virtual clients indicating the number of the virtual clients 40, and load condition information IDs of load condition information created by the load-condition creating section 432.

FIG. 13 is a diagram showing the load condition information created by the load-condition creating section 432 shown in FIG. 11.

The load-condition creating section 432 creates the load condition information shown in FIG. 13 according to an operation of the user.

As shown in FIG. 13, the load condition information includes load condition IDs, server under test IDs of the servers 2 targeted for the load test, request frequencies indicating frequencies of processing requests to the servers 2, and the load information, and the response method designation information (FIG. 5).

FIG. 14 is a diagram showing simulation sequence information created by the simulation-sequence creating section 434 shown in FIG. 11.

The simulation-sequence creating section 434 creates the simulation sequence information shown in FIG. 14.

As shown in FIG. 14, the simulation sequence information includes simulation sequence IDs of respective simulation sequences, the virtual client IDs (FIG. 12) of the virtual clients 40 used in the respective simulation sequences, and durations of processing requests to the servers 2 by the respective virtual clients 40.

The virtual-client managing section 436 stores the created virtual client information (FIG. 12), load condition information (FIG. 13), and simulation sequence information (FIG. 14) in the virtual client DB 438, and manages the information.

The virtual-client managing section 436 serves these pieces of information stored in the virtual client DB 438 for processing performed by the respective components of the simulation program 42.

The simulation executing section 440 sequentially executes the simulation sequences (FIG. 14) in accordance with the simulation sequence information.

In other words, the simulation executing section 440 transmits processing requests from the virtual clients 40 corresponding to the respective simulation sequence IDs and corresponding to the number indicated by the virtual client numbers (FIG. 12) to the servers 2 indicated by the server under test IDs at the frequencies indicated by the processing request frequencies (FIG. 13) for time indicated by the durations.

Figure 15:
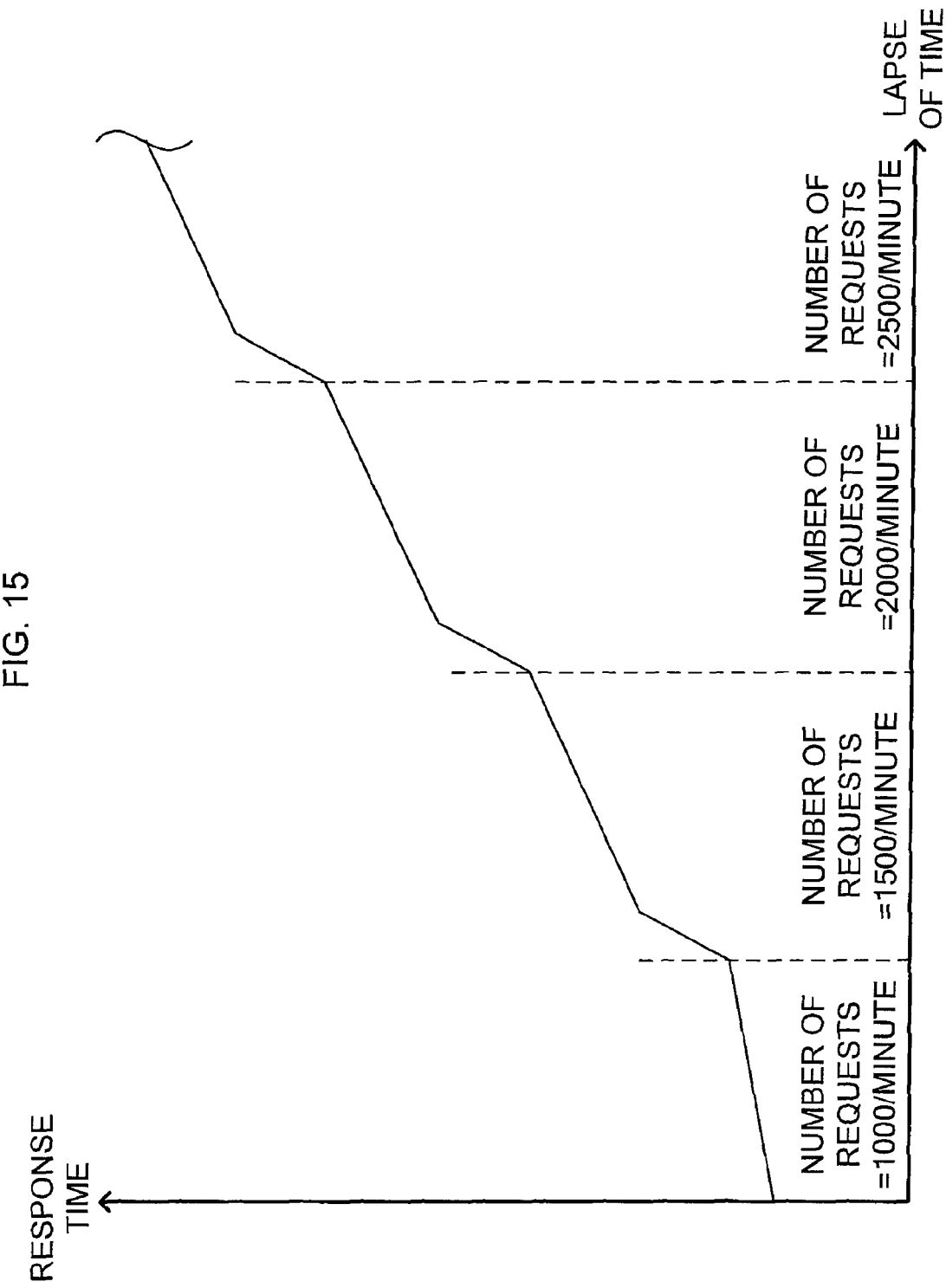
FIG. 15 illustrates a diagram showing an example of a display mode of a compiled result created by a response compiling section shown in FIG. 11, according to an embodiment.

FIG. 15 is a diagram showing an example of a display mode of a compiled result created by the response compiling section 450 shown in FIG. 11.

The response compiling section 450 receives processing responses from the servers 2 as test targets and compiles the processing responses, creates a compiled result indicating, for example, a response time from a processing request until a processing response is returned, and outputs the compiled result to the response displaying section 452.

The response displaying section 452 displays the compiled result from the response displaying section 452 on the input/output device 128 or the like of the simulator 4 through the UI section 422 as a line graph indicating a relation among the number of processing requests per one minute with respect to the servers 2 targeted for a load test, elapsed time, and response time.

Overall Operation of the Load-Testing System 1

An overall operation of the load testing system 1 is explained below.

Figure 16:
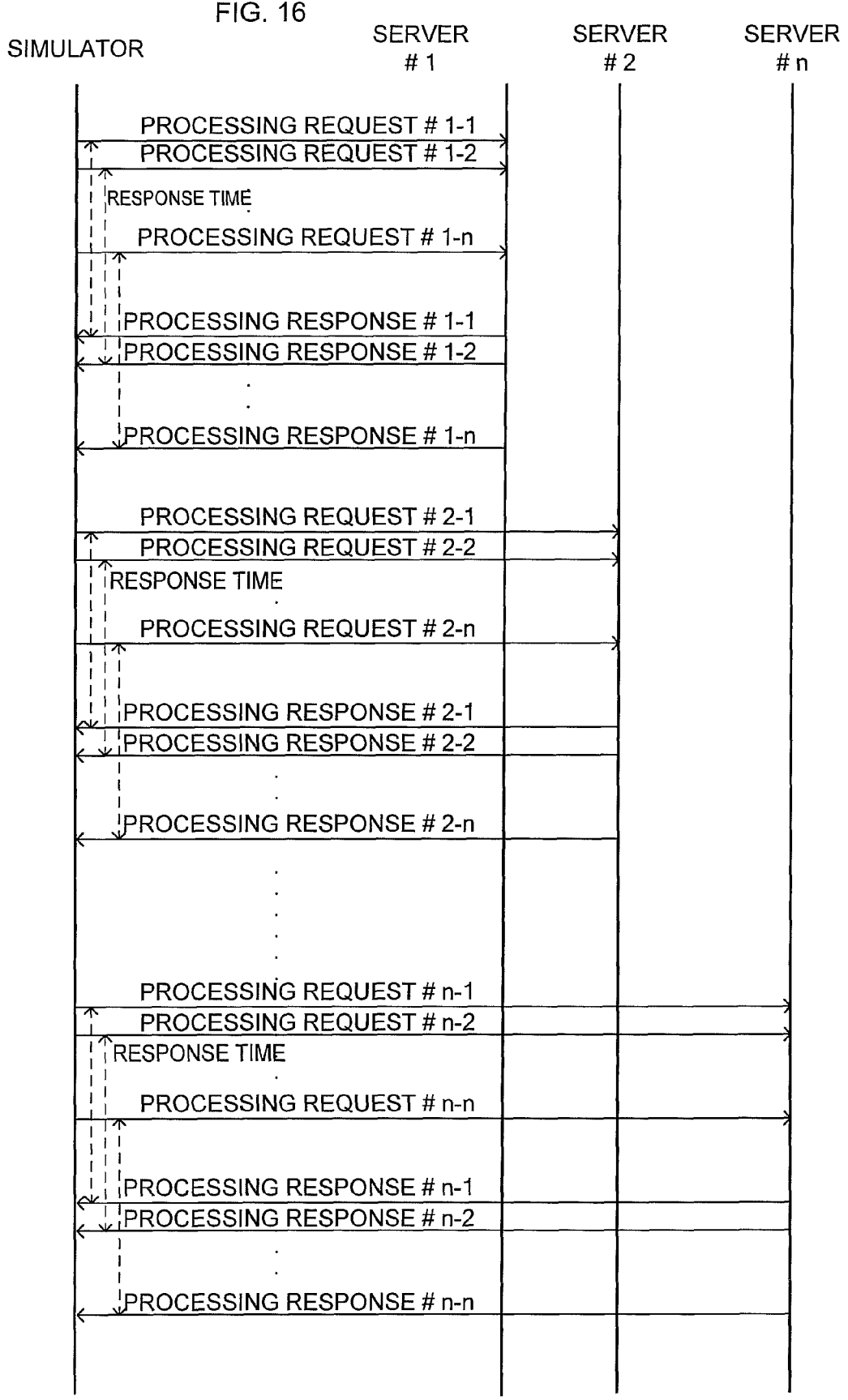
FIG. 16 illustrates a communication sequence chart showing a load test conducted on the servers by the simulator of FIG. 1, according to an embodiment.

FIG. 16 is a communication sequence chart showing a load test conducted on the servers 2-1 to 2-n by the simulator 4.

As shown in FIG. 16, the simulator 4 sequentially executes the simulation sequences.

In other words, processing requests including the information shown in FIG. 5 are sequentially transmitted from the virtual clients 40 to be simulated to the respective servers 2-1 to 2-n.

In response to the processing requests, the respective servers 2-1 to 2-n return processing responses to the simulator 4.

The simulator 4 receives the processing responses, compiles processing times required from the transmission of the processing requests until the reception of the processing requests corresponding to the respective processing requests, and displays a compiled results to the user.

One or more of the steps of the methods described herein, and other steps and software described herein may be implemented as software embedded on a computer readable medium, such as the memory and/or data storage, and executed on a computer system, for example, by a processor. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices. Examples of suitable computer readable storage devices include conventional computer system RAM (random access memory), ROM (read only memory), EPROM (erasable, programmable ROM), EEPROM (electrically erasable, programmable ROM), hard drive, etc.

While the embodiments have been described with reference to examples, those skilled in the art will be able to make various modifications to the described embodiments without departing from the scope of the claimed embodiments.

What is claimed is:

1. A system comprising:
a processor;
a memory coupled to the processor;
a network interface coupled to the processor;
wherein the memory stores a program that, when executed by the processor, causes the processor to:
set a content of testing of remotely located computers under test, the content of testing directly indicates memory operations by respective memories of computers under test;
command the computers under test to perform testing; and
compile responses to the testing returned from the computers under test.

2. The system of claim 1 wherein when the processor sets the content of testing, the program further causes the processor to set the content of testing to be random reads to the memories.

3. The system of claim 2 wherein when the processor sets the content of testing, the program further causes the processor to set the content of testing to include an indication of the number of repetitions of the random reads.

4. The system of claim 2 wherein when the processor sets the content of testing, the program further causes the processor to set the content of testing to also be random writes to the memories.

5. The system of claim 1 wherein when the processor sets the content of testing, the program further causes the processor to set the content of testing to be random writes to the memories.

6. The system of claim 1 wherein when the processor sets the content of testing, the program further causes the processor to set the content of testing to include an indication of the number of repetitions of the random writes.

7. A system comprising:
a processor;
a memory coupled to the processor;
a network interface coupled to the processor;
wherein the memory stores a program that, when executed by the processor, causes the processor to:
set a content of testing of remotely located computers under test, the content of testing directly indicates memory operations by respective storage devices of computers under test;
command the computers under test to perform testing; and
compile responses to the testing returned from the computers under test.

8. The system of claim 7 wherein when the processor sets the content of testing, the program further causes the processor to set the content of testing to be random reads to the storage devices.

9. The system of claim 8 wherein when the processor sets the content of testing, the program further causes the processor to set the content of testing to include an indication of the number of repetitions of the random reads.

10. The system of claim 8 wherein when the processor sets the content of testing, the program further causes the processor to set the content of testing to also be random writes to the storage devices.

11. The system of claim 7 wherein when the processor sets the content of testing, the program further causes the processor to set the content of testing to be random writes to the storage devices.

12. The system of claim 7 wherein when the processor sets the content of testing, the program further causes the processor to set the content of testing to include an indication of the number of repetitions of the random writes.

* * * * *